Aug. 15, 1939.  O. U. ZERK ET AL  2,169,334
POWER TAKE-OFF FOR ENGINE DRIVEN MECHANISMS
Original Filed July 1, 1935   3 Sheets-Sheet 3
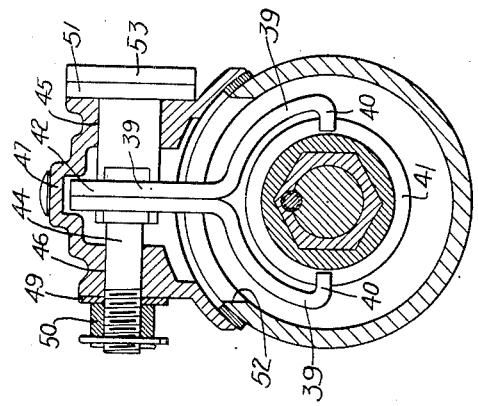
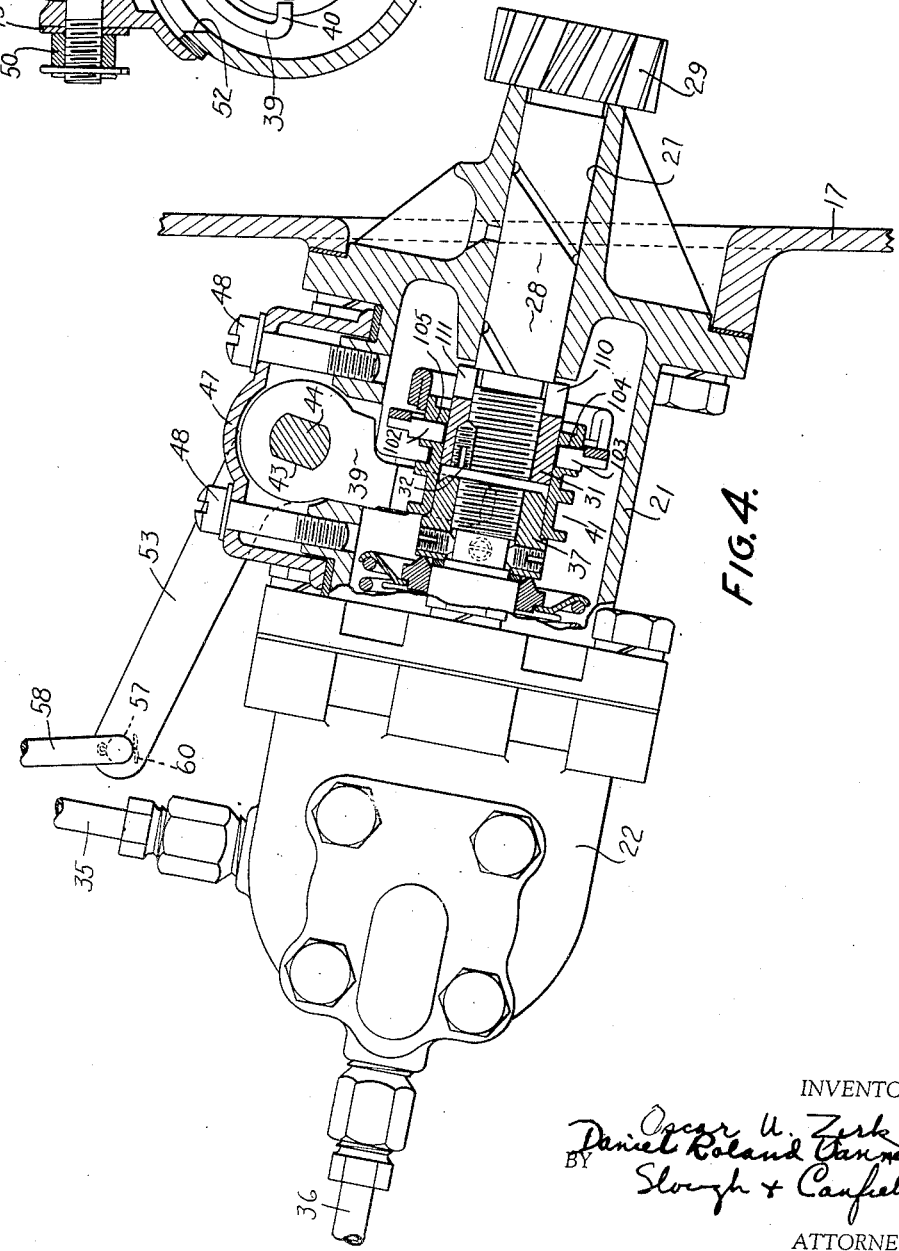
INVENTOR.
Oscar U. Zerk
Daniel Roland Hanneman
BY Slough & Canfield
ATTORNEY.

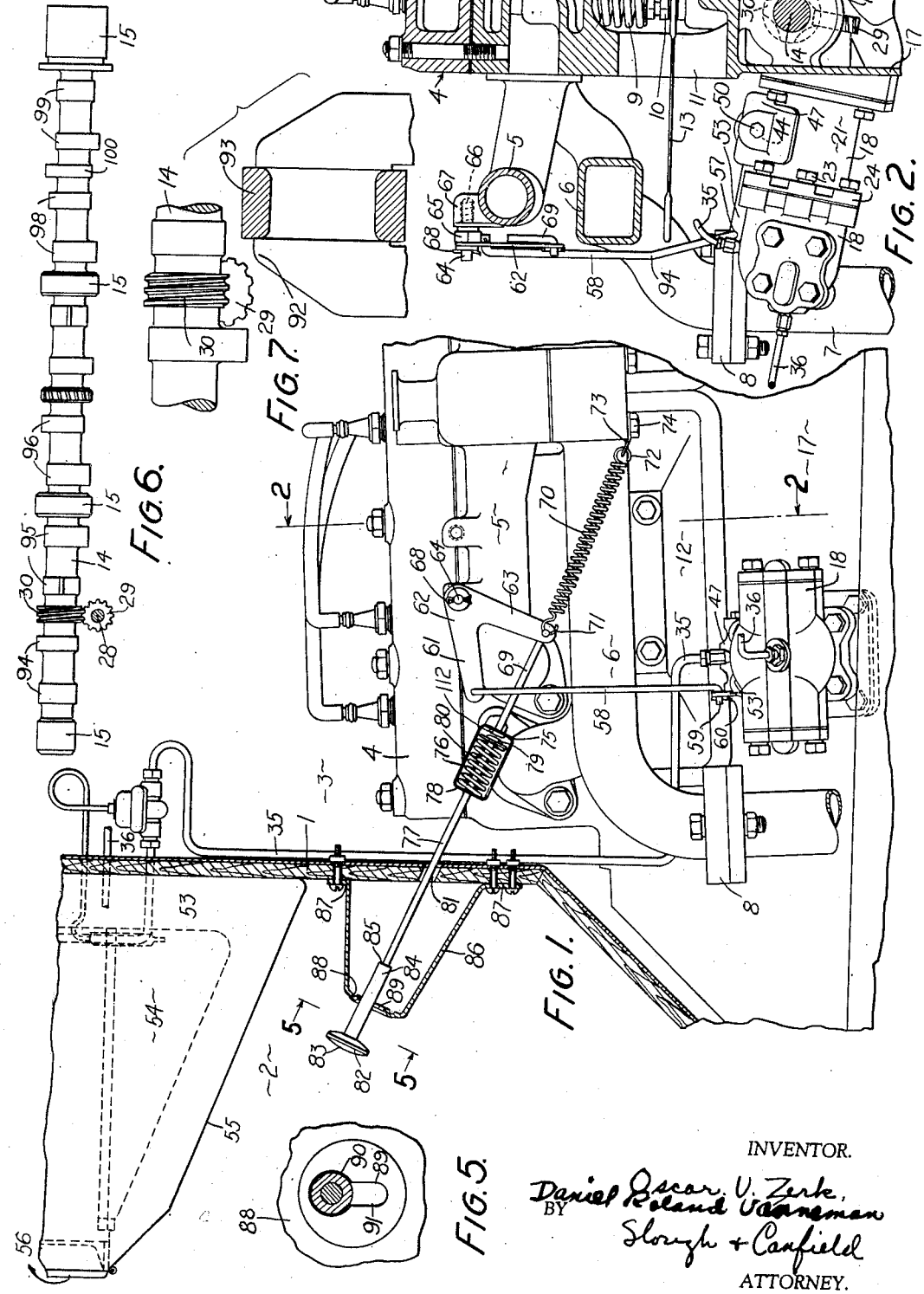

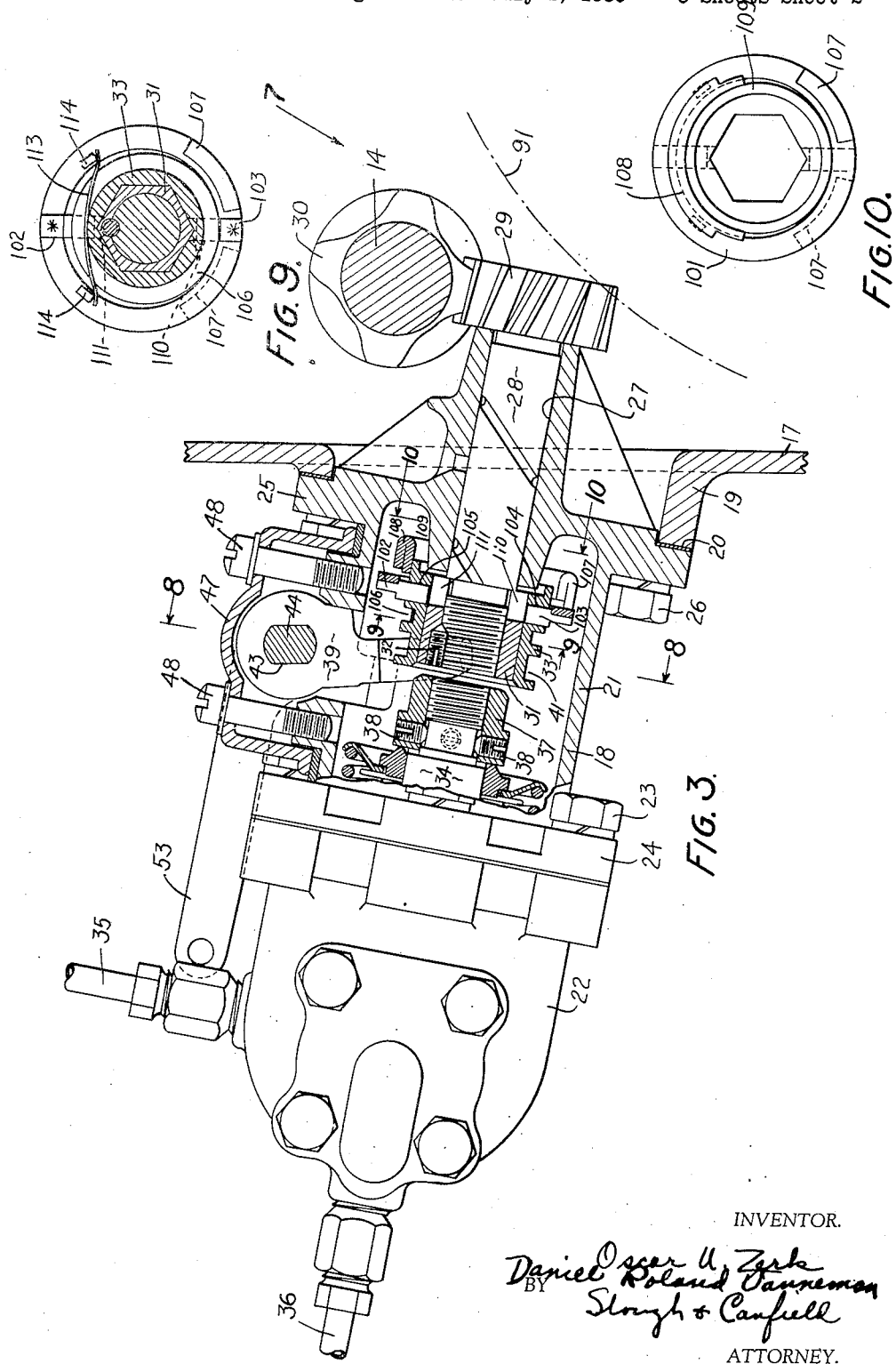

Patented Aug. 15, 1939

2,169,334

UNITED STATES PATENT OFFICE 2,169,334

POWER TAKE-OFF FOR ENGINE-DRIVEN MECHANISMS

Oscar U. Zerk and Daniel Roland Vanneman, Chicago, Ill.; said Vanneman assignor to said Zerk Application July 1, 1935, Serial No. 29,336
Renewed July 12, 1938

7 Claims. (Cl. 74—11)

This invention relates to the driving of mechanisms by power taken directly from internal combustion engines, and to the controlling of the application of power to the mechanisms.

The invention relates particularly to the construction and disposition of the power take-off and the power control.

The invention is particularly applicable to the driving of a refrigerant compressor by the internal combustion engine of an automotive vehicle, to supply compressed refrigerant to a refrigerating system associated with the vehicle and will be described herein as applied to that use.

It is among the objects of the invention:

To provide, for mechanisms generally, an improved power take-off from an internal combustion engine;

To provide an improved power take-off from the cam shaft of an internal combustion engine;

To provide an improved power take-off for driving a refrigerant compressor from the cam shaft of an automotive vehicle internal combustion engine;

To provide a mechanism driving power take-off from the cam shaft of an internal combustion engine having improved positional relation to the power take-off therefrom for driving the engine fuel pump;

To provide a mechanism driving power take-off from the cam shaft of an internal combustion engine providing improved clearance relations to the rotary main shaft, cranks and counterweights of the engine;

To provide an improved mounting for mechanisms driven by power from an engine cam shaft, disposing the mechanism in an improved relation to the engine valve mechanism;

To provide a mounting for mechanisms to be driven by a power take-off from an internal combustion engine, disposing the mechanism in an improved angular relation to the engine proper;

To provide a mounting for mechanisms driven by power from an internal combustion engine cam shaft, disposing the mechanism in an improved manner below the planes on which access is had to the engine valve adjusting mechanism;

To provide, for mechanisms mounted upon and driven by power taken from an internal combustion engine, means for controlling the application of power to the mechanism disposed in an improved manner to give unobstructed access to the engine valve adjusting mechanism.

Other objects will be apparent to those skilled in the art to which our invention appertains.

Our invention is fully disclosed in the following description taken in connection with the accompanying drawings, in which:

Fig. 1 is a side elevational view, partly in cross-section, of a part of an automotive vehicle and of an internal combustion engine therefor illustrating our invention embodied in a refrigerant compressor mounted upon the engine and driven from the cam shaft thereof and controlled from the passenger compartment of the vehicle;

Fig. 2 is a fragmentary sectional view taken approximately from the plane 2—2 of Fig. 1;

Fig. 3 is a view illustrating a compressor driven from the engine cam shaft as viewed in Fig. 2 but drawn to a larger scale and with a power controlling clutch mechanism thereof illustrated in longitudinal section, the clutch elements being illustrated in their disengaged position;

Fig. 4 is a view similar to Fig. 3 but with the clutch elements shown in the engaged position;

Fig. 5 is a fragmentary cross-sectional view taken from the plane 5—5 of Fig. 1;

Fig. 6 is an elevational view of the cam shaft of the engine of Figs. 1 and 2 and illustrating a part of the power take-off therefrom for driving the compressor;

Fig. 7 is a view illustrating the disposition of a part of the power take-off mechanism in relation to one of the rotating cranks and counter-weights of the engine, the view being considered as taken in the direction of the arrow 7 of Fig. 2 or of Fig. 3, but drawn to a different scale from these views;

Fig. 8 is a sectional view taken from the plane 8—8 of Fig. 3;

Fig. 9 is a cross-sectional view taken from the plane 9—9 of Fig. 3;

Fig. 10 is a cross-sectional view taken from the plane 10—10 of Fig. 3 with parts behind the section plane omitted.

Referring to the drawings, Figs. 1 and 2, we have illustrated at 1 a part of the dash or compartment wall between the passenger compartment 2 of an automotive vehicle and the engine compartment 3 thereof. The internal combustion engine of the vehicle is indicated generally at 4 and comprises an intake manifold 5, and exhaust manifold 6 joined to an exhaust pipe by flange connections indicated at 8. The construction of the engine itself except as hereinafter noted constitutes no essential part of the present invention, the construction shown in the drawings being merely illustrative of automotive vehicle engines with which our invention may be employed to advantage.

In the engine chosen for illustration, the valve spring 9 and the mechanism for adjusting the valve tappets, indicated generally at 10, are accessible through openings 11 in the side of the engine, which openings may normally be covered by a cover 12 shown in Fig. 1 and removed in Fig. 2. The valve tappet adjusting mechanism illustrated is of the type adapted to be adjusted by a wrench 13 inserted through the opening 11 to grip a nut element of the mechanism and then swung from side to side, toward and from the observer as viewed in Fig. 2 to adjust the nut element.

The cam shaft of the engine is shown at 14 (see Figs. 2 and 6) rotatably supported by cylindrical bearing portions thereof, 15—15, rotating in suitable bearing supports such as 16 formed in the engine casing. The casing comprises a side wall 17 adjacent to which the cam shaft extends longitudinally in generally parallel relation.

The refrigerant compressor mechanism referred to hereinbefore, is shown generally at 18 and is mounted upon the casing wall 17 externally thereof, as shown in Figs. 1 and 2 and as more completely illustrated in Figs. 3 and 4. Referring to these figures, the casing wall 17 has projecting outwardly laterally therefrom, a tubular wall 19 the outer end of which has an annular face 20 disposed in a plane upwardly inwardly inclined toward the casing. The compressor 18 comprises generally a clutch housing 21 and a compressor housing 22; the clutch housing 21 being secured to the housing 22 by a plurality of screws 23 projected through a flange 24 on the clutch housing. Opposite the flange 24, the clutch housing has a flange 25 secured to the casing wall 17 by a plurality of screws 26 projected through the flange and into thickened portions of the wall 19 (not shown).

The clutch housing 21 is provided with a cylindrical bearing bore 27 in which is rotatably supported a shaft 28 having on its outer end a helical worm gear 29 meshed with a worm 30 on the cam shaft 14. The worm 30 (see Fig. 6) is preferably cut from the material from which the cam shaft is made. Upon the inner end of the shaft 28 is threaded a sleeve 31 locked by a screw 32 threaded into mating keyways in the sleeve and shaft end. The sleeve 31 is exteriorly of hexagon form and a female clutch element 33, generally tubular and interiorly hexagonal, is telescoped on the sleeve 31 and is reciprocable thereon.

A driven shaft 34 is rotatably supported in a suitable bearing, not shown, supported on the compressor housing 22 and is drivingly connected inside the housing 22 with a compressor pump by which refrigerant may be drawn into the housing 22 through a conduit pipe 35 and pumped out of the housing under pressure through a conduit pipe 36. The compressor pump referred to constitutes no essential part of this invention and may be of known or suitable construction operable by a rotary shaft such as the shaft 34.

The inner end of the shaft 34 has threaded thereon an externally hexagonal male clutch element 37, locked by set screws 38—38 threaded radially therethrough and engaging the shaft 34. The shaft 34 is aligned with the shaft 28 so that the female clutch element 33 when reciprocated on the sleeve 31 may telescope over the clutch element 37 and couple together the shafts 34 and 28 so that the shaft 28 may drive the shaft 34 and the compressor referred to; the several elements of the clutch referred to, when in the coupling positions, being illustrated in Fig. 4.

To shift the female clutch element 33 from uncoupling to coupling position, or vice versa, a shifting fork 39 is provided comprising a pair of fingers 40—40 projecting oppositely radially into an annular groove 41 in the female clutch element 33. The fork 39 has a stem 42 provided with an oblong perforation 43 through which is projected a shaft 44 having an intermediate portion conforming to the perforation 43 and at opposite ends having oscillatory bearing in bearing portions 45 and 46 formed in opposite walls of a cup-form cover element 47 which is secured upon the clutch housing 21 by screws 48—48. The shaft 44 is anchored against longitudinal movement by a washer 49 and a nut 50 threaded on the shaft and on the other end by a head 51 on the shaft.

The clutch housing 21 has a large perforation 52 in the wall thereof through which the clutch forks 39 are projected to engage the fingers 40 with the groove 41, and the perforation is closed by the cup-form housing 47.

To oscillate the shaft 44 to shift the clutch as above described, an arm 53 is secured to the shaft head 51 and projects at substantially a right angle to the shaft 44; and as will now be clear, by moving the arm 53 upwardly or downwardly as viewed in Figs. 3, 4 and 2, the clutch above described will be respectively shifted to couple or uncouple the shafts 28 and 34.

As shown in Fig. 1, the conduit pipe 35 communicating with the compressor housing 18 leads from a refrigerator cabinet 54 mounted upon the dash or wall 1 in the passenger compartment 2. The exact construction of the cabinet 54 and of the evaporator or expansion valve which may be provided to refrigerate the interior of the cabinet, constitutes no essential part of this invention. It will therefore suffice herein to say that refrigerant may be returned to the compressor 18 by the conduit pipe 35 and may be supplied by the compressor 18 through the conduit pipe 36 fragmentarily illustrated on the compressor and as entering the cabinet 54; and that the other elements not illustrated of a refrigerating system of the compressed refrigerant type, may be of any known or suitable construction. The cabinet 54 also may be variously constructed, but in the preferred form has a downwardly forwardly inclined lower wall surface 55 to provide leg room in the passenger compartment; and for access to the interior of the cabinet to place articles to be refrigerated therein or to remove them therefrom, a door 56 opening inwardly of the passenger compartment 2 may be provided.

To operate the arm 53 of the compressor to shift the clutch as above described, the following means is provided. The clutch shifting arm 53 is illustrated in Figs. 1 and 2 in the clutch-disengaged position. A perforation 57 (see also Figs. 3 and 4) is provided in the end of the arm 53, and a rod-like link 58, generally vertically disposed, has the lower end bent at an angle and projected through the perforation as shown at 59, Fig. 1, and a cotter pin 60 projected through the end 59 retains it in the perforation. The upper end of the rod 58 is similarly bent and similarly projected through a perforation in one arm 61 of a bell crank, illustrated generally at 62, the bell crank having another arm 63 disposed at an angle of approximately 60 degrees with the arm 61, and the bell crank is disposed with the arm 61 generally horizontal and extending toward the rearward end of the engine. The bell crank 62 at the juncture of the arms thereof is pivotally supported upon a stud 64 which projects through a perforation in the bell crank.

The stud 64 projects from a stud body 65, preferably hexagonal in form, having a shank 66 threaded into an upstanding abutment 67 formed on the intake manifold 5. The bell crank 62 rests against the hexagonal body 65 and a cotter pin 68 projected through the stud 64 retains the bell crank on the stud. A rod 69 has an end thereof bent at an angle and projected through a perforation in the end of the bell crank arm 63 and one end of a tension spring 70 is hooked as at 71 through a perforation in the end of the rod 69, the opposite end of the spring 70 being hooked as at 72 through a perforation in a metal clip 73 secured under the head of a bolt 74 on the engine.

The spring 70 is tensioned to normally hold the bell crank 62 in a counter-clockwise oscillated position to normally exert downward thrust on the link 58 to hold the compressor cutch arm 53 downwardly in the clutch-disengaged position illustrated. To operate the bell crank 62 to oscillate it in the clockwise direction to move the clutch arm 53 to the clutch-engaged position, the following means is provided.

The end of the rod 69 opposite the bell crank engaging end thereof, is projected through a perforation in the end wall of a housing 76 preferably of sheet metal and cylindrical in form. Inwardly of the housing end the rod has an enlarged head 112 engaging the end 75 of the housing. A rod 77, preferably axially aligned with the rod 69, projects through a perforation in the opposite head 78 of the housing 76 and has an enlarged head 79 on the end thereof, which may normally be disposed adjacent to or in engagement with the head 112. A compression spring 80 in the housing 76 abuts at one end upon the housing end 78, surrounds the rod 77 in the housing, and abuts at its other end upon the head 79.

The rod 77 extends into the passenger compartment 2 through an aperture 81 in the wall 1 and has on its end a handle 82 comprising a knob 83 on the end of a shank 84, the shank 84 terminating in a shoulder 85 of substantially greater diameter than that of the rod 77.

A bracket or housing 86, preferably formed from sheet metal, is secured to the wall 1 on the passenger compartment side thereof, for example by a flange or feet 87—87 bolted to the wall 1. The housing 86 has a wall portion 88 disposed in a plane transversely of the shank 84 and provided with a T-for or key-hole form perforation 89 (see Figs. 1 and 5), the perforation 89 having an enlarged upper portion 90 in which the shank 84 may reciprocate and a lower stem portion 91 of slightly greater width than the diameter of the rod 77.

In the operation of the clutch shifting means just described, the spring 70 normally holding the bell crank 62 in its counter-clockwise position illustrated also predetermines a position for the sheet metal housing 76 and the rod 77 with the shank 84 of the handle 82 in the large part 90 of the perforation. When it is desired to shift the clutch, the car driver or a passenger in the passenger compartment 2 may grasp the knob 83 of the handle and pull thereon. This will, by pulling on the rod 77, compress the spring 76 between the end 78 of the housing 76 and the head 79, and pull the housing 76 resiliently with the rod 77. This force is transmitted through the other end 75 of the housing 76 to the head 112 on the rod 69 and exerts a pull on the rod 69, oscillatably moving the bell crank 62 clockwise against the tension of the spring 70. The bell crank transmits its movement through the link 58 to the clutch arm 53 to operate the clutch to engage the elements thereof, as above described.

By continuing to pull on the knob 83, the shank 84 will be withdrawn in the perforation 89 sufficiently to move the shoulder 85 of the stem 84 beyond the perforation 90 in which the stem reciprocates, and then the knob 83 may be depressed which will move the rod 77 into the stem portion 91 of the perforation 89. This will latch the rod 77 in the clutch-operated position, the shoulder 85 engaging the end wall 88 of the housing 86 on portions thereof adjacent the stem-form perforation 91. The parts are so arranged that after the clutch has been fully engaged, continued movement of the handle 82 is necessary to latch it in operated position, and this additional movement is permitted by the spring 80 in the housing 76.

To disengage the compressor clutch elements, the operator may simply elevate the handle 82 and when the shank 84 is aligned with the large part of the perforation 90, the spring 70 will oscillatably move the bell crank 60 to operatively disengage the clutch by downward thrust on the link 58 in a manner that will now be clear; this movement transmitted through the rod 69 also concurrently moving the shoulder 85 of the shank 84 into the housing 86.

It is one of the important features of this invention that the compressor 18 and the mechanism for operating the clutch thereof including the link 58 and bell crank 62 are constructed and positionally disposed so that the power take-off of the compressor from the cam shaft 14 may be out of the rotary path of movement of the engine main cranks and counter-weights; and so that the compressor 18 may be below the space or planes in which operations are performed to give access to and to effect adjustment of the engine valve tappet mechanism 10; and so that the mechanism to operate the compressor clutch may likewise be outside of said space in which said operations are performed. These features of our invention will now be described.

As described in connection with Figs. 2, 3 and 4, the flange 25 of the compressor structure which is integral with the bearing 27 for the shaft 28, is disposed at an inclination to the vertical by being mounted upon the inclined face 20 on the engine casing wall 17. This inclination disposes the shaft 29 at an angle to the horizontal, which angle we have found may suitably be between 10 and 15 degrees. By this inclination, the gear 29 is disposed at an angular inclination which removes it, particularly the lower portions thereof, out of the path of movement of the nearest engine crank and counter-weight. The path of movement of said crank and counter-weight is indicated by the broken line 91 in Fig. 3. This line apparently cuts through the gear 29, but as shown in Fig. 7, the worm 30 is so disposed on the crank shaft 14 that the gear 29 clears the crank shown generally at 92 and the connecting rod 93 associated therewith.

Again, by disposing the gear 29 on the under side of the cam shaft 14, the entire compressor 18 including the uppermost parts thereof will be disposed sufficiently below the lowermost plane in which access is had to the valve tappet adjusting mechanism 10 to permit free access thereto by removal of the cover plate 12, and to permit free movement of a tool such as the wrench 13 to adjust the mechanism. These standardized movements need not be changed because of the installation of the compressor on the engine.

Again, by providing a clutch shifting arm 53 extending outwardly laterally away from the engine casing, and by supporting the bell crank 62 at a point laterally spaced from the engine proper, as clearly illustrated in Fig. 2, the link 58 may be disposed outwardly of the space in which said customary operations are performed, and in this connection the link 58 may have a bend 94 therein to give further clearance to a stool such as the wrench 13 and to further enlarge the said space or zone in which said operations are performed.

To suitably coordinate the compressor and the power take-off therefor with the other parts of the engine in the manner and for the purposes described above, we prefer to locate the worm 30 on the cam shaft as illustrated in Fig. 6. The cam shaft illustrated is for a six-cylinder engine comprising pairs of cams 94 to 99 inclusive. At 100 is illustrated the eccentric for driving the engine fuel pump, not shown, this eccentric being disposed between two pairs of cams 98 and 99 at one end of the cam shaft. We find that the worm 30 referred to can be advantageously disposed for the purposes described between the two pairs of cams 94 and 95 at the opposite end of the cam shaft, the worm 30 which is the power take-off for the compressor and the eccentric 100 which is the power take-off for the fuel pump, being disposed symmetrically with respect to the longitudinal center of the cam portion of the cam shaft.

It is desirable in some cases that the clutch above described shall be operable by the clutch shifting mechanism only at predetermined speeds of the shaft 28, i. e. predetermined speeds of the internal combustion engine. We prefer to cause the clutch shifting mechanism to be operative only when the engine is not running or when it is running at idling low speeds. To this end the following mechanism may be provided.

A ring 101 surrounds the female clutch element 33 and carries a pair of pins 102 and 103 secured thereto for example by spot-welding and diametrically aligned and reciprocable in aligned diametrically disposed bores 104 and 105 extending through the female clutch element 33 and aligned with slots 110 and 111 in the sleeve 31. The pins thus support the ring and the ring is reciprocable transversely of the shaft 28.

A flat spring 113 engages at opposite ends upstanding pins 114—114 on the ring 101, and in its intermediate portion resiliently presses upon the bottom of a groove 106 in the female clutch element, and the spring thus normally by its resilience pulls the reciprocable ring 101 in the position to withdraw the pin 102 out of the slot 111 in the sleeve and into the bore 105 in the female clutch element. The pin 103 is shorter than the pin 102 and therefore in this position of the ring does not project into the slot 110 in the sleeve.

With the parts in this position, the female clutch element 33 may be shifted in the operation of the clutch device, and this position of the parts corresponds to the stand-still or idling speed of the engine. When the engine revolves the cam shaft 14 and therefore the shaft 28 at a speed higher than the engine idling speed, a weight 107, preferably in two parts above and below the ring 101 and secured to the ring, respond to their centrifugal force of rotation and reciprocate the ring 101 to project the pin 102 into the slot 111 of the sleeve, thereby locking the clutch element 33 to the sleeve, preventing shifting movement of the clutch element. A counter-weight 108 secured to the female clutch element 33, preferably to a flange 109 thereof, counter-balances by its centrifugal force the weights 107.

Our invention is not limited to the exact details shown and described. Many modifications and changes may be made therein within the spirit of our invention and without sacrificing its advantages, and within the scope of the appended claims.

We claim:

1. In combination with an internal combustion engine having an apertured walled casing and a cam shaft, and a valve tappet mechanism, an accessory mechanism frame, a mechanism on the frame and a mechanism driving shaft having a gear thereon projecting from the shaft all supported solely by the frame as a unitary self-contained structure, the shaft adapted to be projected through the apertured casing wall to drivingly engage the gear with the cam shaft gear and the frame adapted to be detachably secured to the engine casing, and extending laterally therefrom, the mechanism and frame being disposed with all parts thereof below the lowest plane in which operations are performed to adjust the valve tappet mechanism, the mechanism comprising a clutch associated with the mechanism shaft and a vertically movable clutch operating element disposed laterally outwardly of the engine beyond the space in which operations are customarily performed to adjust the valve tappet mechanisms, and link means associated with the operating element for effecting movement thereof manually preventing movement of the clutch operating element to a clutch engaged position by the link means above a predetermined rotational speed of the cam shaft gear.

2. In combination with an internal combustion engine having an apertured walled casing and a cam shaft, a gear on the cam shaft, a mechanism including a housing detachably secured to the engine casing, a first shaft projecting from the housing through the casing aperture having a gear thereon meshed with the cam shaft gear, a second shaft rotatably mounted in the housing adapted to drive an accessory mechanism, cooperating clutch elements on the shaft whereby they may be rotatably interlocked, means extending externally of the housing for effecting engagement or disengagement of the clutch element, and means preventing engagement of the clutch elements above a predetermined rotating speed of said first shaft.

3. In an automotive vehicle including an internal combustion engine having an apertured walled casing and a cam shaft, a gear on the cam shaft, a mechanism including a housing detachably secured to the engine casing, a first shaft projecting from the housing through the casing aperture having a gear thereon meshed with the cam shaft gear, a second shaft rotatably mounted in the housing adapted to drive an accessory mechanism, cooperating clutch elements on the shaft whereby they may be rotatably interlocked, means externally of the housing for effecting engagement and disengagement of the clutch elements extending through the vehicle dashboard and accessible by the vehicle operator, and means preventing engagement of the clutch elements above a predetermined rotating speed of said first shaft.

4. In combination with an internal combustion engine having an apertured walled casing and a cam shaft, a gear on the cam shaft, a mechanism including a housing detachably secured to the engine casing, a first shaft projecting from the housing through the casing aperture having a gear thereon meshed with the cam shaft gear, a second shaft rotatably mounted in the housing adapted to drive an accessory mechanism, cooperating clutch elements on the shafts whereby they may be rotatably interlocked including a slideable clutch element and means locking the slidable clutch element to one of said shafts in a clutch disengaged position when its associated shaft is rotating above a predetermined speed preventing engagement of the clutch elements.

5. In an automotive vehicle including an internal combustion engine having an aperture in a lateral wall thereof and a cam shaft gear accessible through said aperture, and a gear on the cam shaft, a unitary mechanism including a housing detachably secured to the engine casing for intermittently driving a pump or the like, a shaft rotatably mounted in the housing including a gear meshing with the cam shaft gear, an axially slidable clutch element on the shaft, a second shaft axially aligned with the first shaft and adapted to be driven thereby including a clutch portion engaged by movement of the slidable clutch element to interconnect the shafts, centrifugal means locking the slideable clutch element with the first shaft above a predetermined speed of the first shaft to prevent movement thereof to an engaged position, link means extending to the vehicle dashboard for operating the slideable clutch element below said predetermined speed, and spring means tending to maintain the slideable clutch element in the disengaged position.

6. In combination with an internal combustion engine having an apertured walled casing and a cam shaft, a gear on the cam shaft and a valve tappet mechanism, an accessory mechanism frame, a mechanism on the frame and a mechanism driving shaft having a gear thereon projecting from the shaft all supported solely by the frame as a unitary self-contined structure, the shaft adapted to be projected through the apertured casing wall to drivingly engage the gear with the cam shaft gear and the frame adapted to be detachably secured to the engine casing, and extending laterally therefrom, the mechanism and frame being disposed with all parts thereof below the lowest plane in which operations are performed to adjust the valve tappet mechanism.

7. In combination with an internal combustion engine having an apertured walled casing and a cam shaft, a gear on the cam shaft, a mechanism including a housing detachably secured to the engine casing, a first shaft projecting from the housing through the casing aperture having a gear thereon meshed with the cam shaft gear, a second shaft rotatably mounted in the housing adapted to drive an accessory mechanism, cooperating clutch elements on the shaft whereby they may be rotatably interlocked, means extending externally of the housing and operable from the vehicle driving compartment for effecting engagement or disengagement of the clutch elements, and means preventing engagement of the clutch elements above a predetermined rotating speed of said first shaft.

OSCAR U. ZERK.
DANIEL ROLAND VANNEMAN.